United States Patent
Gross et al.

(10) Patent No.: US 7,532,609 B2
(45) Date of Patent: *May 12, 2009

(54) FAIRNESS METHOD FOR SUPPLEMENTAL CHANNEL RESOURCES

(75) Inventors: Jonathan H. Gross, Gilbert, AZ (US); Daniel R. Tayloe, Phoenix, AZ (US); Shawn W. Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1591 days.

This patent is subject to a terminal disclaimer.

(21) Appl. No.: 10/272,174

(22) Filed: Oct. 15, 2002

(65) Prior Publication Data

US 2004/0071125 A1 Apr. 15, 2004

(51) Int. Cl.
*H04B 7/212* (2006.01)
*H04Q 7/00* (2006.01)
*H04L 12/66* (2006.01)
*H04Q 7/20* (2006.01)

(52) U.S. Cl. .................. 370/347; 370/331; 370/352
(58) Field of Classification Search ............. 455/347, 455/335, 349, 522, 69, 127.1, 439, 453; 370/347, 370/355, 352, 328, 331
See application file for complete search history.

(56) References Cited

U.S. PATENT DOCUMENTS

| | | | |
|---|---|---|---|
| 6,327,256 B1 * | 12/2001 | Paivike et al. | 370/337 |
| 6,414,938 B1 * | 7/2002 | Corke et al. | 370/231 |
| 6,876,868 B2 * | 4/2005 | Crocker et al. | 455/522 |
| 7,072,663 B2 * | 7/2006 | Ramos et al. | 455/453 |
| 7,218,630 B1 * | 5/2007 | Rahman | 370/355 |
| 7,453,860 B2 * | 11/2008 | Hogberg et al. | 370/341 |
| 2002/0123351 A1 * | 9/2002 | Miyoshi et al. | 455/452 |

* cited by examiner

Primary Examiner—Tilahun B Gesessse

(57) ABSTRACT

An RF power fairness method (26) receives a request for supplemental channel resources (160). If sufficient supplemental channel resources (time slots and data rates) are not available, the original request is modified (166). If there is multiple call activity on the supplemental channel, RF power is calculated for each of the simultaneous calls on the shared channel (202, 208). If successful time slots and data rates are found, a grant message is returned from the time slot manager (26) to the base station (164, 170, 180). If insufficient time slots and data rate power are determined, a deny request message is transmitted to the base station (184).

15 Claims, 5 Drawing Sheets

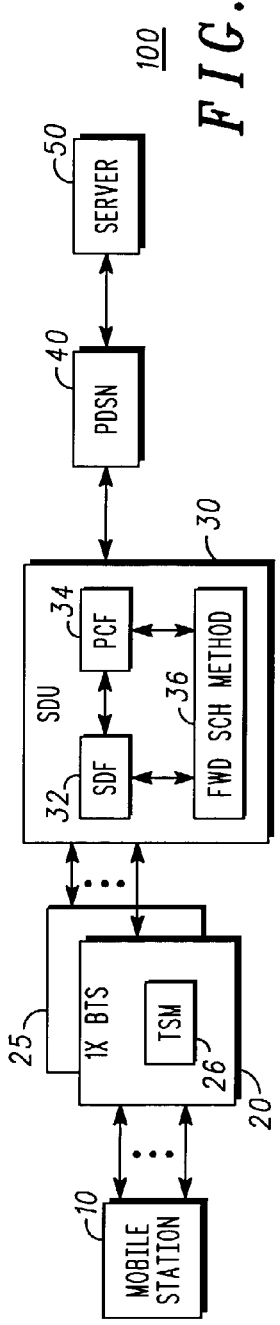
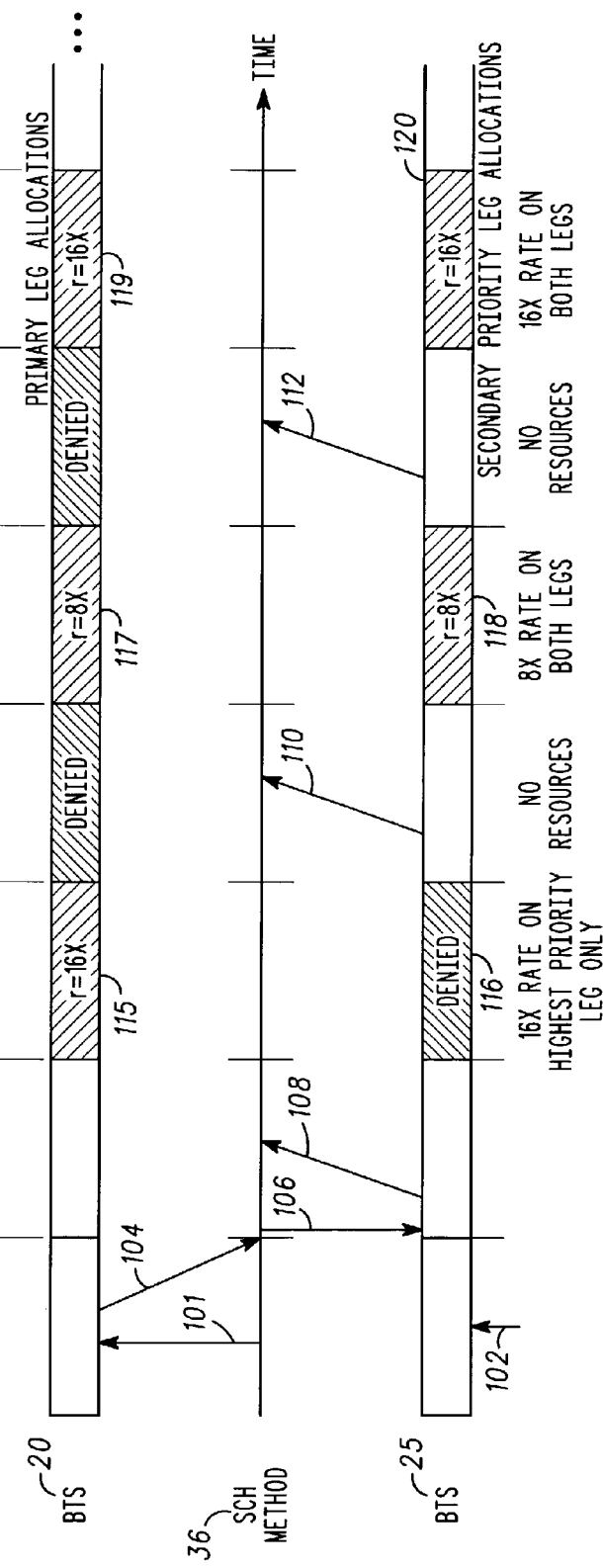

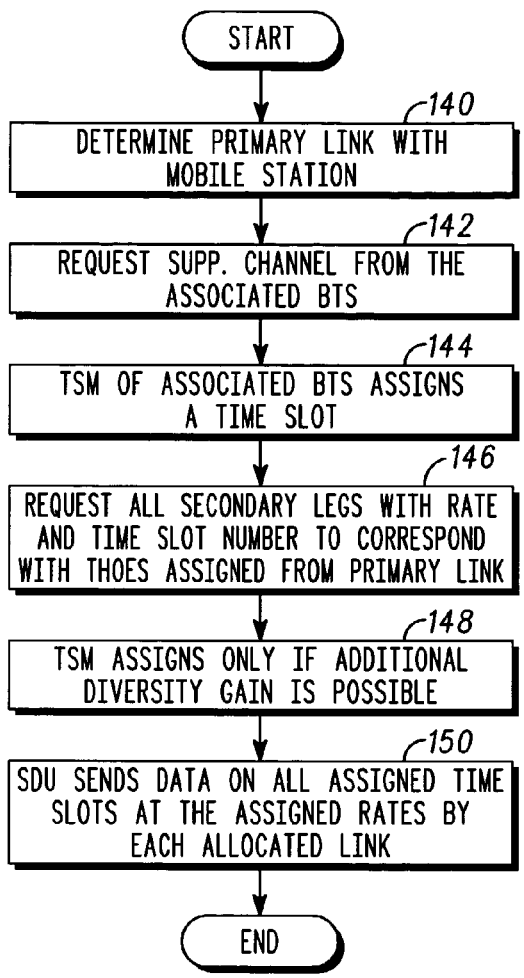
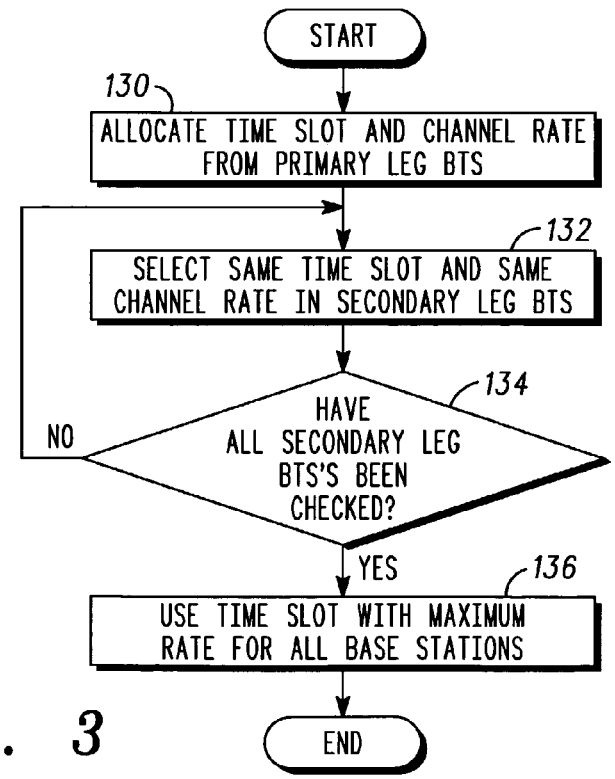
FIG. 4
FIG. 3

FAIRNESS METHOD FOR SUPPLEMENTAL CHANNEL RESOURCES

BACKGROUND OF THE INVENTION

The present invention pertains to cellular communication systems and more particularly to efficiently using an allocated shared channel resource in the cellular communication system.

Modern cellular telecommunication systems include mobile users, base stations, mobile switching centers (MSC), and message distribution centers (MDC). A base station includes a base station transceiver and a base station unit. In CDMA (Code Division Multiple Access) systems, multiple base station transceivers may be in communication with each particular mobile unit. Therefore, each mobile unit may have several links from the telecommunication equipment to it in the communication mode at a single time. One of these links will be designated primary. As can be seen, there is much equipment associated with a modern cellular communication link or channel. Since data as well as voice type communications are desirable by mobile telecommunication users, high data rate resources are installed within the telecommunication system.

These high data rate resources are supplemental forward and reverse channels with a capability to transmit far in excess of current voice channel limitations. Such high data rate equipment, and the radio spectrum and/or power consumed, is by nature expensive. Therefore, this equipment and system resources must be shared in order to provide economical services to many mobile units.

Each channel has a number of time slices which make up the channel and may operate at various transmission rates. Typically mobile units request when connecting to the system the highest rate possible that they can handle. To fulfill this request the base station presently considers the user's subscribed rate, previously allocated channels and the current message flow backlog.

This base station scheme does not work well for transmission control protocol (TCP) flows and yields a significantly lower throughput. The present scheme yields varying requested rates which cause TCP to react to the varying bandwidths by substantially reducing throughput.

Further, the base station transceiver typically searches for the highest channel rate available up to the requested rate by the mobile unit. If for any reason the base station transceiver (BTS) cannot provide this highest channel rate, the BTS will then search for the next lower rate beginning with the earliest available time slot (time slice). This process continues until a success is found or the searching is exhausted and therefore the request is denied.

Further complicating matters, since CDMA systems typically have several links to the mobile unit, this process must be repeated and negotiated to find a common rate and time slice among the several base station transceivers involved with the mobile unit. Therefore, again subscriber throughput may be severely impacted due to limitations with the weakest or most congested base station.

Accordingly it is highly desirable to have methodology for efficient selection of rates and time slot assignments within the base station to substantially increase system throughput.

BRIEF DESCRIPTION OF THE DRAWING

FIG. 1 is a block diagram of a cellular communication system in accordance with the present invention.

FIG. 2 is a time slot (or time slice) diagram of a base station and two base station transceivers.

FIG. 3 is a flow chart of a base station scheduling method in accordance with the present invention.

FIG. 4 is a flow chart of a base station supplemental channel scheduling method in accordance with the present invention.

DESCRIPTION OF THE PREFERRED EMBODIMENTS OF THE INVENTION

Figure 5:
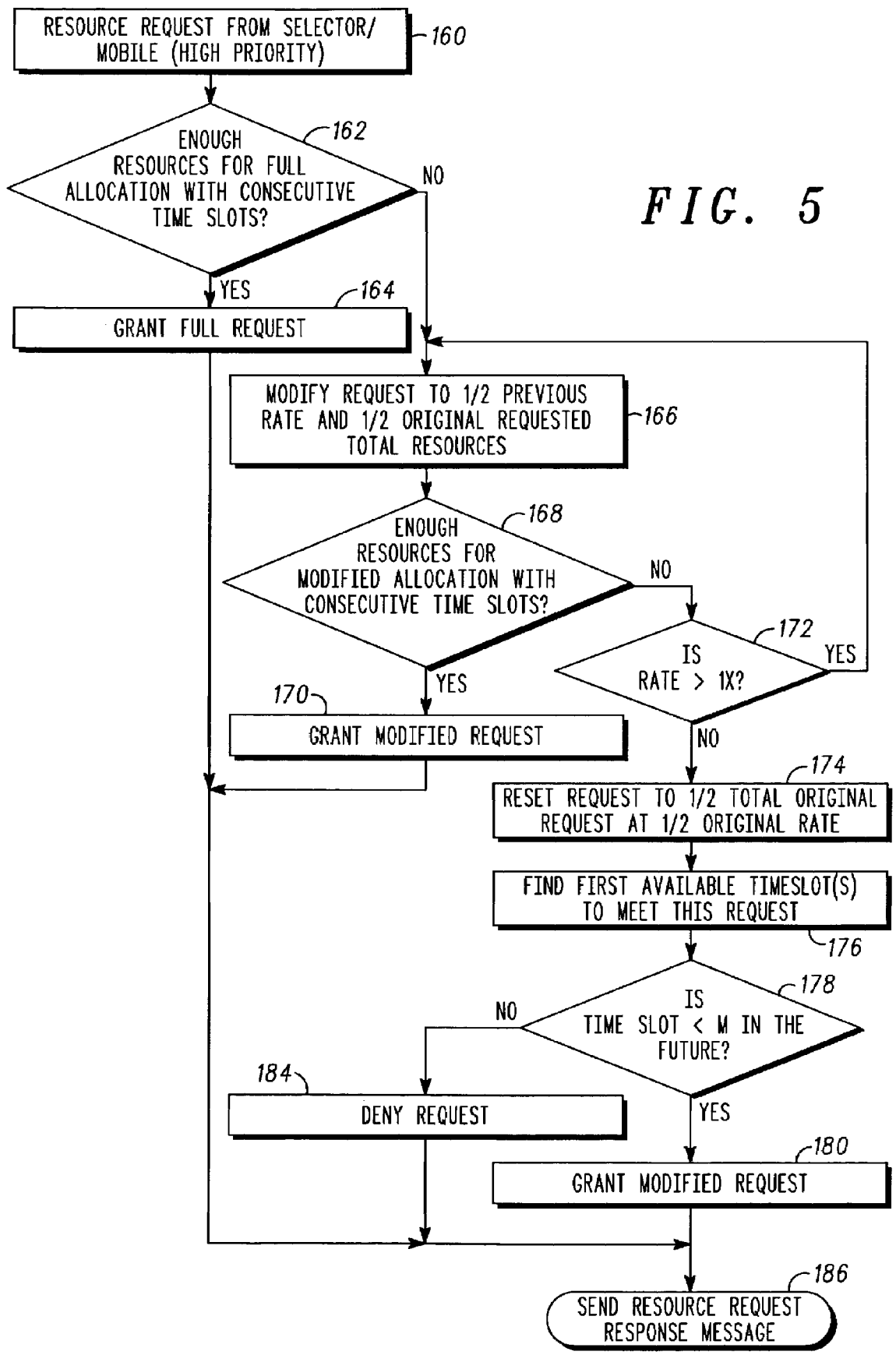
FIG. 5 is a flow chart of a supplemental channel fairness method in accordance with the present invention.

FIG. 1 is a block diagram of a cellular communication system embodying the principles of operation of the present invention. The present invention will be explained in the context of CDMA 2000 type network, although other networks such as UMTS may be utilized. The shared channel resources to be explained apply to the supplemental channels in both the forward and reverse links. However, the forward link will be used as the primary means of explanation. Resources which are manageable by this methodology include channels, power of the channels and Walsh codes, for example.

The elements involved in the explanation of the present invention are mainly mobile unit or mobile station 10, 1XBTS (base station transceiver) base stations 20-25, each including a time slice (or slot) manager 26 and Selector Distribution Unit 30 including selection distribution function 32, packet control function (PCF) 34, and Forward Supplemental Channel Method 36. In CDMA 2000, mobile station 10 has links to 1XBTS 20 and 1XBTS 25. 1XBTS is a base station with many transceivers. In the soft handoff condition, mobile station is linked to several base stations and primarily operates with the base stations having the best signal link quality. However, when handoff occurs one or more of the existing base stations may drop their links with the mobile station 10 and one or more base stations may add new links to the mobile station 10. Each base station includes a time slice manager (TSM) 26 that assigns mobile stations to particular time slots and channels in the CDMA data frame. The SDU 30 provides the transmission of signaling and bearer messages to and from packet data support node 40 and the many base stations 20-25 for subsequent routing to mobile stations. Server 50 is coupled to PDSN 40 and represents a typical end point for such actions as internet access, data transmission or voice information. SDU 30 further includes packet control function 34 that is coupled to selection distribution function 32. The SDU 30 also includes the forward supplemental channel (SCH) method 36. The reverse supplemental channel method is the same as the forward and is not shown for the sake of simplicity.

Scheduling Method

Referring to FIGS. 2 and 3 taken together, the shared channel scheduling method 36 will be explained. SDU 30 and 1XBTS 20 through 25 comprise one or more base stations. FIG. 2 depicts a time slot (time slice) arrangement on the horizontal axis and the various control functions on the horizontal axis. The current time slot is TS0. The time slots then increase by one for each time slot giving time slots TS1 through TS6 shown for the sake of explanation. The supplemental channel method 36 is shown on the center timeline. Located above is the primary base station transceiver (BTS) 20 and located below method 36 is a secondary BTS 25.

The method to be explained in FIG. 3 for sharing the supplemental channel is termed "fire and forget" method. The primary leg BTS will allocate a time slice and rate and send a response to the SDU, block 130. At this point, the SDU forwards a request to each secondary leg BTS to select the same time slice and rate per the response from the primary leg BTS, block 132. The SDU does not wait for a response from the secondary leg BTS(s). The SDU assumes that there is a reasonable probability that at least one additional links or ("leg") will grant the supplemental channel request at the given rate for the given time slice that matches the primary BTS response. The links or legs are those supported by each of the base stations 20-25 with the mobile station 10 as shown in FIG. 1.

For example, if the shared channel method 36 were to require an 8X channel, block 130 would select the next time slot with the maximum rate required for the primary leg base station BTS 20. This would result in the selection of time slot (slice) 117 which is time slot (slice) TS4 for the primary leg BTS. Next block 132 requests the same time slice and rate for the secondary link(s) or leg(s) for the other secondary leg BTS(s) 25. This results in the allocation of time slot 118 in time slot 4 at the 8X channel rate. Since, the data transmission rate which the shared channel method was requesting was a rate of 8x and both channels 117 and 118 are available, these channels will be utilized to communicate from BTS 20 and 25 respectively to mobile unit 10. Both these channels will be available and send data at the allocated time and data rate to mobile station 10. In the instant example, only two BTS links were employed. If more links are utilized, method 36 will determine whether all the coupled base station via other secondary links have been selected, block 134. If less than all of the links have been selected, block 134 will transfer control to block 132 to select the same time slot for that secondary link until all the secondary links have been handled. When all the links which are coupled from BTSs to the mobile station have been selected, block 134 transfers control to block 136 which sends the data from the SDU 30 to the mobile station via the allocated links from all the BTSs 20-25.

The process is then ended. This fire and forget methodology recognizes that the request is granted from the primary leg BTS. The shared channel method 36 does not wait for response from each secondary leg BTS. Subsequent time slots for the mobile station are selected in a similar fashion.

One advantage of the fire and forget method is that it eliminates inefficiency associated with reserving the shared channel resource at each base station transceiver during a negotiation process which has multiple links or legs due to soft handoff conditions. Further, because the SDU 30 does not wait for the secondary leg BTS response message, the time slice duration may be reduced thereby improving overall efficiency.

The data transmission rates referred to in this application translate to particular kilo-bits per second rates, as shown in Table 1 below.

TABLE 1

| Rate | Kilo-bits Per Second |
|---|---|
| 1X | 9.6 |
| 2X | 19.2 |
| 4X | 38.4 |
| 8X | 76.8 |
| 16X | 153.6 |

FIG. 4 is a flow chart of another embodiment of a supplemental channel scheduling method termed a request/response type method. FIGS. 4 and 2 will be used to explain this method.

In this methodology as opposed to that as shown in FIG. 3, the SDU 30 does not immediately begin sending data to the BTS 20. Instead in this method SDU 30 makes a resource request to the BTS with the highest priority (primary) link. That is, the highest priority (primary) link is the best link between a BTS and the mobile station 10. First the SDU determines which is the highest priority (primary) link with the mobile station 10, block 140. Next, SDU 30 requests the supplemental channel with the maximum rate, for example, 16X, from the BTS associated with the highest priority link, block 142. The time slot (slice) manager 26 of the associated BTS 20, for example, then assigns the particular time slot (slice) and responds to SDU 30 with the time slot (slice) number, block 144 and channel rate.

Next, the supplemental channel scheduling method 36 requests all secondary links for specific resources with rate and time slot number corresponding to the one assigned from the primary link, block 146. The time slot manager 26 of each BTS 20-25 assigns the specific resources requested only if there are sufficient resources (power, channel elements, etc.) in order to provide the link with additional diversity gain, block 148, that meets a given diversity gain threshold.

Lastly, the data is sent from the SDU to the mobile on all the assigned time slots for each BTS at the rate assigned by the primary BTS, block 150. That is, secondary leg BTSs that did not allocate resources will not receive data. Therefore, during any given time slots, the mobile station 10 may not have the benefit of all diversity gain possible. Time slots in which one or more secondary links from secondary leg BTSs are used such as time slots 118 and 120, the mobile station will have diversity gain and therefore more reliable data. The additional diversity gain from secondary links is therefore provided when and only when the system has sufficient resources available to do so and the use of those resources provide sufficient diversity gain. This mechanism provides the means to tradeoff system resources to provide higher quality links or to provide higher system capacity.

As an example, refer again to FIG. 2. Again, the current time slot is time slot 0 and the primary link is handled by BTS 20. At time slot 0 the supplemental channel scheduling method 36 of SDU 30 sends a request to the primary BTS 20 for three time slots at the maximum rate of 16X. In this example depicted in FIG. 2, the time slot manager 26 of BTS 20 was unable to assign all three time slots with a 16X rate. Time slot manager 26 assigned time slot 115 and time slot 119 with a maximum rate of 16X and time slot 117 with a rate of 8X or half the maximum rate. Once SDU 30 receives this information from BTS 20, SDU 30 then sends a resource request message to the secondary link BTS 25 requesting the maximum 16X rate for time slots 2 and 6 and the 8X rate for time slot 4. BTS 25, the secondary link manager, has its time slot manager 26 respond with a denial for time slot 2 and a granting of 16X for time slot 6 (120) and a granting of 8X for time slot 4 (118), based on the availability of resources and the determination that these allocations provided sufficient additional diversity gain to meet the required threshold. The SDU then transmits data at 8X during time slot 4 and 16X during time slot 6 to both base station transceivers 20 and 25. SDU 30 transmits data at the 16X rate in time slot 2 (115) only to BTS 20 which is the primary link BTS. As a result, mobile subscriber 10 will have diversity gain for two of the three time slots allocated by the primary link BTS 20. That is, diversity gain will exist during time slots 4 and 6. There is no availability of time slot 2, since the time slot manager 26 of BTS 25 denied the request for time slot 2 availability.

It should be pointed out that response messages from the BTSs associated with each of the secondary links are delayed to the greatest extent possible, and delivered to the SDU 30 on a just-in-time basis, by the associated time slot manager (TSM) 26 so that each BTS can reserve resources for higher priority subscribers such as those subscribers in which it is the primary link. The above-mentioned process is continually repeated until the mobile station 10's service is completed.

The SDU request/BTS response methodology described above provides for giving preference to the best link between the BTS and the mobile station. The best link is selected based on a number of criteria such as received signal strength. As a result of using and giving preference to the best link, the overall system saves on power in this example. That is, weak links require more power to affect communications with the BTS. The primary benefit of this approach is that during period of time where there is significant contention for resources, the system will tend to allocate fewer secondary legs per mobile station, thus maximizing overall system capacity. Conversely, when resources are not in contention, this system will provide highest number of secondary legs providing the highest quality of service.

The diversity gain criteria used for secondary leg allocation may itself be adaptively based on system load, mobile speed, and other factors.

Further, the above methodology eliminates the need to reserve resources at any of the BTSs while awaiting the negotiations among each of the primary and secondary BTSs to reach common allocation. Further, in the case of secondary links, the processing of data requests through secondary links is much simpler, saving the system processing resources.

Further, it may be possible to make secondary link decisions on a frame-by-frame basis based upon BTS power constraints. The result would be that only frames with available power are used for transmission within an allocated time slot.

Fairness Method

In order to prevent certain mobile stations from monopolizing the high-data rate supplemental channel and such mobile stations from consuming great amounts of system power, fairness methodology is employed in the time slot manager 26 of each 1XBTS 20-25.

Referring to FIG. 5, the fairness method for channel resources is shown in the form of a flow chart. Time slot manager 26 receives a resource request from the selector or SDU selection distribution unit 30 or mobile station 10, block 160. SDU 30 initiates this request for the forward supplemental channel and the mobile station 10 initiates this request for the reverse supplemental channel. This method applies to both the forward and reverse supplemental channels.

Next, block 162 determines whether enough time slot resources are available for a full allocation for time slots selected. Referring again to FIG. 2, for example, the selector 30 may for the primary link, BTS 20, select time slots 2, 4 and 6 with the maximum rate of 16X, for example. If the TSM 26 is able to grant the request, block 162 transfers control to block 164 via the yes path and the request is fully granted. Then block 186 sends the resource request response message to the selector 30.

If the resources were not sufficient to grant the full request, block 162 transfers control to block 166 via the no path. For example, referring to FIG. 2, in time slot 4 for the primary BTS 20 the time slot 117 was only able to provide an 8X rate. Block 166 modifies the original request to select one half of the originally selected rate and one half the original requested resources. Again, referring to FIG. 2 in the example of BTS 20, only time slot 117 needs to be modified by half the previous rate to fit the original request of three time slots.

Next, block 168 determines whether enough resources for the modified request are available having consecutive time slots starting with the next time slot. If enough resources are available to fill the request as modified, block 168 transfers control to block 170 which grants the modified request. Then the time slot manager 26 sends a resource request response message to selector or SDU 30, block 186.

Referring again to the example for BTS 20 in FIG. 2, since time slot 117 was an 8X rate and the original request was 16X, the resources did not meet the requirements so block 168 transfers control to block 172 via the no path. Block 172 determines whether the rate is greater than 1X. If the rate is greater than 1X, block 172 transfers control to block 166 via the yes path. In our example of FIG. 2, the rate has been cut in half from 16X to 8X in time slot 117. Since an 8X time slot was selected to replace a 16X time slot previously, another time slot of 8X and rate will be required to complete the request. This time slot will exist in a time slot greater than TS 6, that is TS 7 or farther. If a suitable such time slot is found, block 166 transfers control of block 168 which in turn transfers control to block 170 and grants the request and causes block 186 to send the resource request response message back to the SDU 30. If the request for another 8X time slot cannot be found, block 166 cuts the rate in half and the process of block 168 and 172 is iterated.

After successive iterations, if the rate has been halved to a point where the rate is no longer greater than 1X, block 172 transfers control to block 174 via the no path. Block 174 modifies the original request to one-half the total originally requested time slots at one-half the original rate. Block 176 then searches to find the first available time slot with these modified requirements. The search begins with the time slots beyond the next time slot up to M time slots away. M is a predetermined selected number which will keep the request in the present frame of time slots.

Next, block 178 determines whether the time slot found by block 176 is less than M time slots in the future. If the time slot found is not less than M time slots in the future, that is if it is greater than or equal to M time slots, block 178 transfers control to block 182 via the no path. Block 182 denies the request and sends the denied request message back to the selector 30 via block 186. If the time slot found by block 176 is less than M time slots in the future, block 178 transfers control to block 180 via the yes path. Block 180 grants the modified request and transfers control to block 186 to send the resource request grant response message back to SDU or selector 30.

It should be noted that this channel fairness algorithm is one of many that could be employed to yield the intended result that is to allocate a fair amount of channel resources to multiple subscribers contending for a limited amount of resources.

In this fairness method a particular mobile station will not capture all the high data rate (16X) channel resources continually to the exclusion of the other mobile stations.

Figure 6:
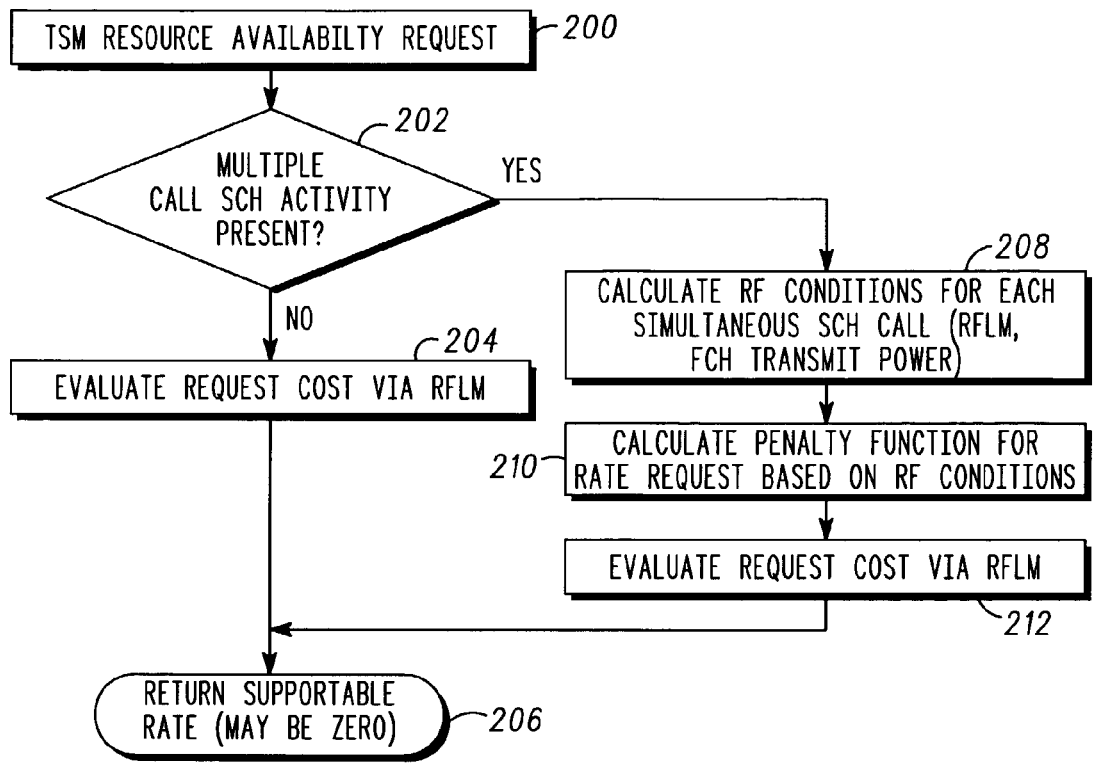
FIG. 6 is a flow chart of a power fairness method in accordance with the present invention.

Referring to FIG. 6, a power-based fairness method is shown in the flow chart. The power required for each time slot depends on the link conditions, including distance and propagation paths, between the BTS and the mobile station. CDMA system capacity and performance are highly dependent on the link conditions, and RF power requirements, to each mobile subscriber being served.

The time slot manager 26 of a BTS receives a resource availability request from the selector or SDU 30, block 200. Next, block 202 determines whether there is a multiple mobile station call supplemental channel activity present. If there is no multiple call activity present on the supplemental channel, block 202 transfers control to block 204 via the no path. Block 204 evaluates the requested resources from an RF load management standpoint. Next, block 206 returns the message to SDU 30 indicting a supportable transmission rate with the requisite power.

If multiple call supplemental channel activity is present, block 202 transfers control to block 208 via the yes path. Block 208 calculates the RF conditions for each simultaneous supplemental channel call. That is it looks into the load management and the forward channel transmission power. Next, block 210 calculates the penalty function for the rates requested based on RF conditions. This allows the requested rate for each mobile to be adjusted based on that mobile's RF conditions when necessary in a multiple-mobile scenario. For example, the rate could be reduced (or penalized) for mobiles that are in poor RF conditions in order to prevent them from consuming too much system capacity and power, thus granting more users in better RF conditions higher data rates. Finally, block 212 evaluates direct costs via the RF load management and returns a supportable transmission rate and requisite power to SDU 30, block 206.

Figure 7:
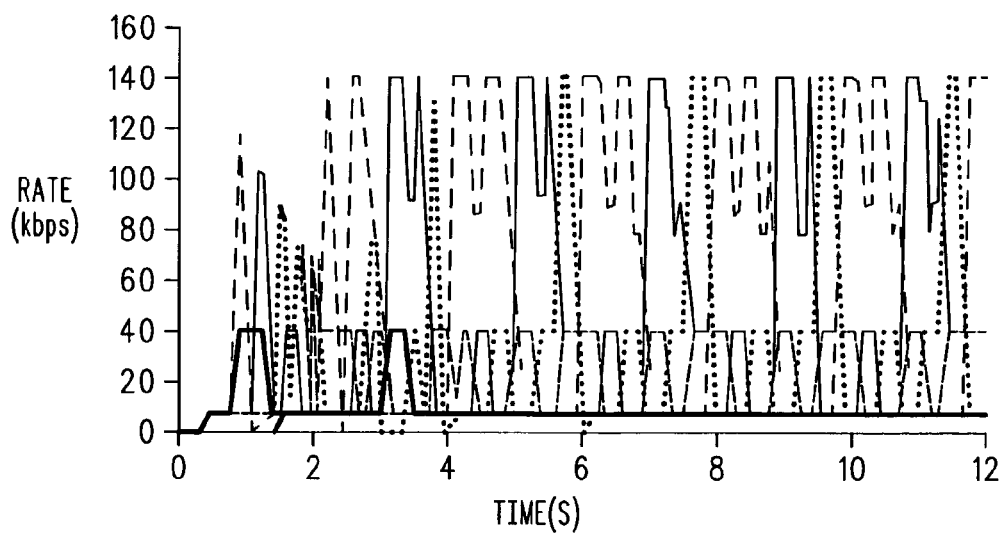
FIG. 7 is a data diagram depicting through-put rate versus time without the present invention.

FIG. 7 is a diagram of a plot of rate over time for a simulation test of five callers. FIG. 7 shows that each of the callers is assigned radically different transmission rates over time. Such constant changing of transmission rates substantially affects the throughput of the base station, and the behavior of higher-layer protocols such as TCP (Transmit Control Protocol), in a negative manner.

Figure 8:
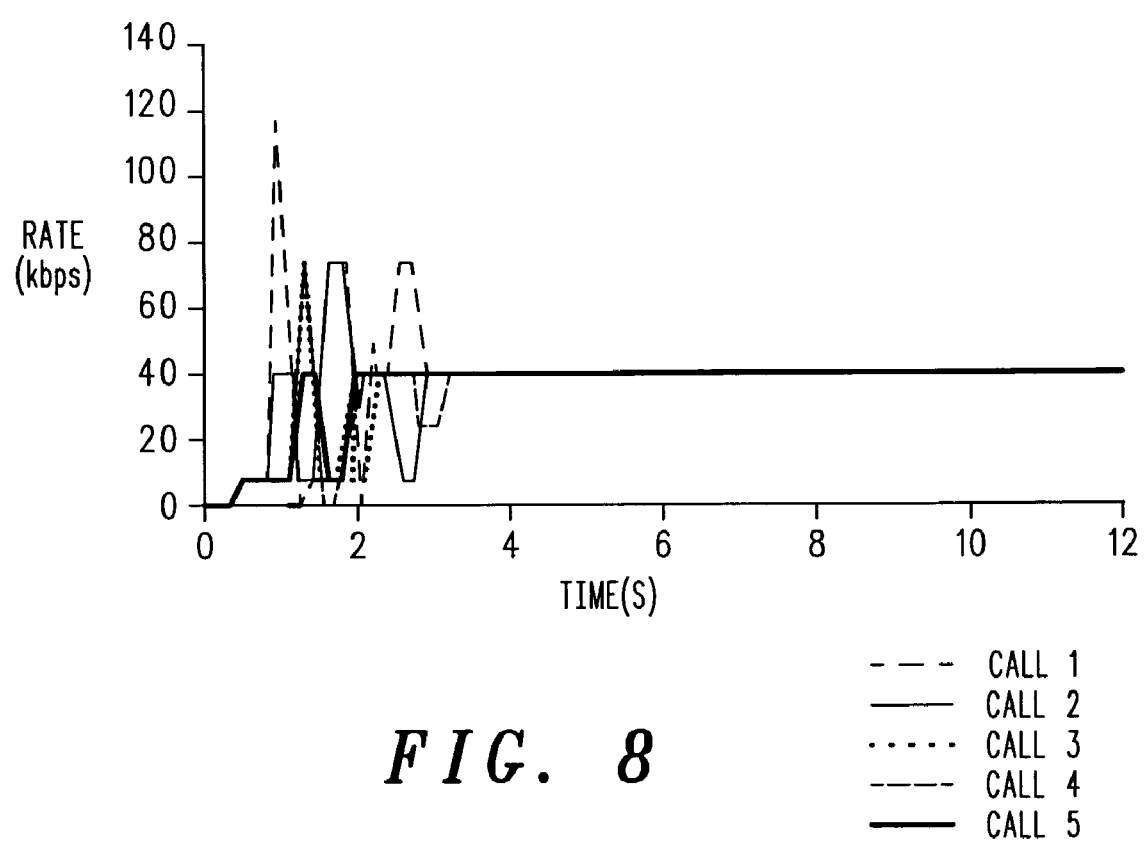
FIG. 8 is a diagram of data rate versus time with the present invention.

FIG. 8 is a similar plot of transmission rate versus time for five callers. The results depicted are simulation results. FIG. 8 shows that there is some substantial rate changing for a short while; however, after a brief period the rates converge and settle out to a high throughput of about 40 kilo-bits per second. The results of FIG. 8 include both the supplemental channel scheduling method and the fairness methods mentioned above. Contrast FIG. 8 with FIG. 7 that shows a result throughput just slightly above the zero mark in kilo-bits per second transmission rate.

The present inventions as described provide a simple, low complexity means and method to manage a set of shared supplemental channel calls and providing substantial diversity gains for the soft handoff function. Further, the number of subscribers or callers that can effectively use the supplemental channel and its high-speed access is maximized. The methods described herein do not overburden the processing power of the base station.

The time slot manager bases its decisions on power fairness, that is links between the base station and the mobile station which are more remote may be expendable if they are secondary links.

The present invention provides enhanced call processing by handling the primary link first and then the secondary link; simplified, aggressive supplemental channel scheduling methodology with a slow start transmission; and resource management by fairness based methodology for power and supplemental channel resources.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a communication system, including a selection distribution unit (SDU) and a plurality of base station transceivers (BTSs) coupled to a plurality of mobile stations each BTS of the plurality of BTSs including a time slot manager coupled to the BS, a method for supplemental channel resource fairness comprising the steps of:

requesting at least one time slot at a data rate R for a first mobile station of the plurality of mobile stations;

modifying by the time slot manager the at least one time slot and data rate R for the at least one time slot for the first mobile station;

determining whether the data rate R is greater than a basic rate (1X);

finding a first available time slot for at least one time slot at the modified data rate R;

determining by the time slot manager whether the first available time slot is less than a predetermined number of time slots from a present time slot; and if the first available time slot is less than the predetermined number of time slots from the present time slot, sending a grant modified request message by the time slot manager to the SDU.

2. In a communication system, a method for supplemental channel resource fairness as claimed in claim 1, wherein the step of requesting is performed by the SDU on a forward supplemental channel.

3. In a communication system, a method for supplemental channel resource fairness as claimed in claim 1, wherein the step of requesting is performed by the first mobile station on a reverse supplemental channel.

4. In a communication system, a method for supplemental channel resource fairness as claimed in claim 1, wherein there is further included a step of sending a deny resource message by the time slot manager to the SDU, if the first available time slot is greater than or equal to the predetermined number of time slots from the present time slot.

5. In a communication system, a method for supplemental channel resource fairness as claimed in claim 1, wherein after the step of modifying by the time slot manager, there is further included a step of determining by the time slot manager whether sufficient resources are available for a modified request.

6. In a communication system, a method for supplemental channel resource fairness as claimed in claim 5, wherein there is further included a step of sending by the time slot manager a grant message to the SDU, if sufficient resources are available for the modified request.

7. In a communication system, a method for supplemental channel resource fairness as claimed in claim 5, wherein if sufficient resources are not available for the modified request, then there is further included a step of performing the step of determining whether the data rate R is greater than the basic rate (1X).

8. In a communication system, a method for supplemental channel resource fairness as claimed in claim 5, wherein there is further included a step of iterating the steps of:

modifying by the time slot manager the requested number of time slots N and data rate R for each time slot;

determining whether sufficient resources are available for the modified request; and determining whether the data rate R is greater than the predetermined threshold.

9. In a communication system, a method for supplemental channel resource fairness as claimed in claim 1, wherein after the step of requesting the at least one time slot, there is further included a step of determining by the time slot manager whether sufficient resources are available for the request.

10. In a communication system, a method for supplemental channel resource fairness as claimed in claim 9, wherein if there are sufficient resources there is further included a step of sending a grant original request message by the time slot manager to the base station.

11. In a communication system, a method for supplemental channel resource fairness as claimed in claim 9, wherein if there is insufficient resources for the step of requesting, then there is further included a step of performing by the time slot manager the step of modifying by the time slot manager the at least one time slot at data rate R.

12. In a communication system, a method for supplemental channel resource fairness as claimed in claim 1, wherein the step of modifying by the time slot manager includes the step of modifying the data rate R to one half of the requested data rate R.

13. In a communication system, a method for supplemental channel resource fairness as claimed in claim 1, wherein there is further included a step of iterating the steps of modifying, determining and finding for a plurality of requested time slots.

14. A method for supplemental channel fairness between a base station and at least one base station transceiver coupled to at least one mobile station, the method for supplemental channel fairness comprising the steps of:

requesting to a time slot manager of the at least one base station transceiver, a requested number of time slots N at a data rate R for the at least one mobile station;

modifying by the time slot manager the requested number of time slots and a time slot location of the requested number time slots N and the data rate R;

finding by the time slot manager a first available time slot at modified data rate R' if said first available time slot being less than a predetermined number of time slots from a present time slot and sending a grant modified request message by the time slot manager to a selection distribution unit (SDU).

15. In a communication system, including a selection distribution unit (SDU) and a plurality of base station transceivers (BTSs) coupled to a plurality of mobile stations each BTS of the plurality of BTSs including a time slot manager coupled to the BS, a method for supplemental channel resource fairness comprising the steps of:

requesting at least one time slot at a data rate R for a first mobile station of the plurality of mobile stations;

modifying by the time slot manager the at least one time slot and data rate R for the at least one time slot for the first mobile station;

determining whether the data rate R is greater than a basic rate (1X);

finding a first available time slot for at least one time slot at the modified data rate R;

modifying by the time slot manager the requested number of time slots N and data rate R for each time slot;

determining whether sufficient resources are available for the modified request; and determining whether the data rate R is greater than the predetermined threshold.

\* \* \* \* \*